US006689200B2

(12) United States Patent
Scarborough et al.

(10) Patent No.: US 6,689,200 B2
(45) Date of Patent: Feb. 10, 2004

(54) FILM-FORMING WATER-BASED WATER REPELLENT COATING COMPOSITIONS

(75) Inventors: Victoria D. Scarborough, Memphis, TN (US); Timothy G. Teague, Olive Branch, MS (US); Cedric M. Wilson, Memphis, TN (US); Heath G. Saunders, Roanoke, VA (US)

(73) Assignee: The Sherwin-Williams Company, Cleveland, OH (US)

( * ) Notice: Subject to any disclaimer, the term of this patent is extended or adjusted under 35 U.S.C. 154(b) by 6 days.

(21) Appl. No.: 10/205,099

(22) Filed: Jul. 25, 2002

(65) Prior Publication Data

US 2003/0091809 A1 May 15, 2003

Related U.S. Application Data

(60) Provisional application No. 60/308,626, filed on Jul. 25, 2001.

(51) Int. Cl.$^7$ .................................................. C09D 5/20
(52) U.S. Cl. ........................... 106/2; 106/241; 106/285; 106/287.23; 106/287.24; 427/384; 427/372.2; 525/301; 525/193; 524/457; 524/458; 524/460; 524/510; 524/515; 524/522; 524/533; 524/539
(58) Field of Search ............................ 106/2, 241, 285, 106/287.23, 287.24; 427/372.2, 384; 525/301, 193; 524/457, 458, 460, 510, 515, 522, 533, 539

(56) References Cited

U.S. PATENT DOCUMENTS

| | | | |
|---|---|---|---|
| 3,915,921 A | 10/1975 | Schlatzer, Jr. | 260/17.4 |
| 4,421,902 A | 12/1983 | Chang et al. | 526/317 |
| 4,509,949 A | 4/1985 | Huang et al. | 586/558 |
| 4,735,995 A | 4/1988 | Chettiath | 525/301.5 |
| 4,923,940 A | 5/1990 | Hsu | 526/208 |
| 4,996,274 A | 2/1991 | Hsu | 526/208 |
| 5,004,598 A | 4/1991 | Lochhead et al. | 424/59 |
| 5,073,195 A | 12/1991 | Cuthbert et al. | 106/2 |
| 5,074,912 A | 12/1991 | Liles et al. | 106/2 |
| 5,104,737 A | 4/1992 | Arora | 428/432.1 |
| 5,300,327 A | 4/1994 | Stark-Kasley et al. | 427/387 |
| 5,310,780 A | 5/1994 | Tomko et al. | 524/591 |
| 5,338,345 A | 8/1994 | Scarborough et al. | 106/2 |
| 5,371,112 A | 12/1994 | Sayre et al. | 521/48 |
| 5,421,866 A | 6/1995 | Stark-Kasley et al. | 106/2 |
| 5,695,551 A | 12/1997 | Buckingham et al. | 106/2 |
| 5,739,196 A | 4/1998 | Jenkins et al. | 524/460 |
| 5,912,299 A | 6/1999 | Tomko et al. | 524/840 |
| 5,916,960 A | 6/1999 | Lum et al. | 524/507 |
| 5,973,029 A | 10/1999 | Hsu et al. | 523/201 |
| 5,988,455 A | 11/1999 | Pearson et al. | 222/402.1 |
| 6,022,925 A | 2/2000 | Tomko et al. | 524/547 |
| 6,057,400 A | 5/2000 | Kinney et al. | 524/591 |
| 6,166,127 A | 12/2000 | Tomko | 524/507 |
| 6,191,213 B1 | 2/2001 | Tomko et al. | 524/591 |
| 6,218,012 B1 | 4/2001 | Rota et al. | 428/402 |

FOREIGN PATENT DOCUMENTS

| | | |
|---|---|---|
| EP | 0 036 639 A2 | 9/1981 |
| EP | 0 472 973 A1 | 3/1992 |
| EP | 0 587 332 A1 | 3/1994 |
| WO | WO 96/40511 | 12/1996 |
| WO | WO 00/02934 | 1/2000 |
| WO | WO 00/22016 | 4/2000 |

OTHER PUBLICATIONS

Hans Heber, "Deutsche Patent–Sprache in der Lacktechnik", 6/98, vol. 104, No. 6, pp. 58, 60–63.
Michelman, Inc., Michelman Wood Treatments, Michem Wood 40 Deck Stain/Sealant Additive Solvent–Like Performance, Low VOCs, supplier's literature, pag056afax.pdf, 1 page.
Michelman Inc., Technical Data Sheet, Michem Wood Coating 50, May 17, 1999, (Revision Date: Mar. 23, 1998), 1 page.
Rhodia Inc., Manalox supplier's litrature, 11/98, 8 pages.
Rohm and Haas, Rhoplex Multilobe 200 supplier's literature, May 1992, 17 pages.
Rohm and Haas, Material Safety Data Sheet, Rhoplex AC–264 Emulsion, MSDS Date: Nov. 16, 1994, 8 pages.
Rohm and Haas Company, Rohm and Haas Kentucky Incorporated, Material Safety Data Sheet, Rhoplex Multilobe 200 Emulsion, Apr. 1, 1997, 8 pages.
Rohm and Haas Company, Rhoplex AC–264 Emulsion Polymer supplier's literature, Jan. 1992, 20 pages.
Union Carbide, NeoCar Acrylic 820 supplier's literature, 9/98, 1 page.
Union Carbide, NeoCar Acrylics supplier's literature, 9/98, 6 pages.
Union Carbide, NeoCar Acrylics 7657 and 7658 supplier's literature, 9/98, 2 pages.
Union Carbide, Ultracryl Latex 701 supplier's literature, 1997, 12 pages.
Union Carbide Corporation, Standard Specification "Ultracryl" Latex 701, Effective Date: Jul. 27, 1998, 1 page.
Union Carbide Corporation, Material Safety Data Sheet, Ultracryl Latex 701, 7 pages.
Union Carbide Corporation, UCAR Latex 651, supplier's literature, 10/97, 7 pages.
Union Carbide Corporation, Cutting Edge Technology, Neo-Car Polymers, supplier's literature, 1996 & 8/97, 12 pages.

*Primary Examiner*—C. Melissa Koslow
(74) *Attorney, Agent, or Firm*—Robert E. McDonald; Arthi K. Tirey; Vivien Y. Tsang

(57) ABSTRACT

Aqueous water repellent coating compositions comprising admixtures of (i) water-based water repellent compositions and (ii) water-reducible film-forming polymers are disclosed.

33 Claims, No Drawings

FILM-FORMING WATER-BASED WATER REPELLENT COATING COMPOSITIONS

CROSS-REFERENCE TO RELATED APPLICATION

This application claims the benefit of U.S. Provisional Application No. 60/308,626, filed Jul. 25, 2001.

BACKGROUND OF THE INVENTION

1. Field of the Invention

This invention relates to aqueous water repellent coating compositions comprising admixtures of (i) water-based water repellent compositions and (ii) water-reducible film-forming polymers. One particularly useful application of these compositions is in making substrates, especially porous substrates, more water repellent. Another aspect of this invention relates to a method for improving the water repellency of coatings comprising a water reducible film-forming polymer by admixing therewith a water-based water repellent composition. Additionally, this invention relates to a method of making a substrate more water repellent by application of the coating composition of this invention to the substrate and allowing the coating composition to cure or dry. Furthermore, this invention relates to the provision of durable color to a substrate by application of these coatings.

2. Description of the Prior Art

Conventional water repellent coating compositions or sealers are generally low viscosity, colorless or semi-transparent, penetrating liquids. One of the primary functions of these water repellent coating compositions is to prevent the penetration of liquid water into the pores of the substrates to which the composition is applied. These water repellent penetrating compositions are designed to waterproof a variety of dry, porous substrates such as wood, brick, masonry, concrete, tile and stucco.

Water repellent coating compositions typically contain a non-volatile composition. This non-volatile composition contains the active water repellent ingredients. These ingredients remain on, and penetrate into, the treated substrate after the coating composition is applied and the liquid carrier evaporates. The active water repellent ingredients contained in the non-volatile composition can include a variety of materials. These materials typically include various waxes, resins, fragrances, preservatives and surface tension modifying chemicals.

The solvent carrier used in many typical water repellent coating compositions is usually a volatile organic compound (VOC) so that the entire composition is organic. These solvent-based compositions, although often having adequate performance as water repellent compositions, are less desirable due to the presence of such organic solvents.

Water-based water repellent compositions have also been developed and have the advantage of minimizing organic solvents. Many of the conventional water-based compositions, however, incorporate conventional surfactants or hydrophilic portions which remain in the compounds and reduce their water repellency.

One approach to overcoming the drawbacks of those conventional approaches is that described in U.S. Pat. No. 5,338,345 issued Aug. 16, 1994, entitled "Water-Based Water-Repellant Coating Compositions" (the "'345 Patent"). In the '345 Patent, the coating composition comprises an emulsion having water as the continuous phase, and as the discontinuous phase, droplets of a non-volatile organic water repellent composition. The emulsion contains an emulsion stabilizing amount of a hydrophobically modified polyacrylic acid polymer wherein the viscosity of the emulsion is less than about 100 Cps and the particle size of the droplets is less than about 50 microns. The relatively low viscosity and small particle size provides for easy application and excellent penetration into porous substrates. The non-volatile organic water repellent composition taught in the '345 Patent includes conventional materials such as liquids (e.g. linseed oil), natural and synthetic waxes, and hydrocarbon resins. The process of making the compositions of the '345 Patent involves the making of a conventional emulsion of this type and then subjecting the emulsion to high kinetic energy processing so as to produce the desired viscosity and particle size.

The compositions taught in the '345 Patent provide excellent performance as a result of their composition, relatively low viscosity, and relatively small particle size. We have now, however, unexpectedly discovered an improvement in water-based water repellent compositions produced according to the '345 Patent. In attempting to improve the performance of the emulsions described in the '345 Patent, we have discovered that admixtures of the emulsions of the '345 Patent and at least one water-reducible film forming polymer provide stable aqueous final formulas having excellent water repellency and improved durability and color retention. These combinations of properties are unexpected because the water-reducible film-forming polymers themselves typically have very poor measured water repellency and would be expected to have a negative impact on the measured water repellency when added to the emulsions described in the '345 Patent. This is particularly true because many water reducible film-forming polymer compositions incorporate non-volatile surfactants, or have hydrophilic groups or polymer segments which will remain in the resulting coating and thus greatly reduce the water repellency.

The combination of the emulsions described in the '345 Patent with water-reducible film-forming polymers surprisingly results in water-based water repellent compositions having excellent water repellent characteristics. Additionally, the water-reducible film-forming polymers allow for the convenient incorporation of colored pigments that add durable color to the substrate and enhance its appearance. The combination of the two components can provide low viscosity products having high application solids, lower levels of volatile organic compounds ("VOC"), excellent water repellent efficiency (% WRE), improved durability, and allow for the ready addition of pigments to the compositions.

BRIEF SUMMARY OF THE INVENTION

This invention relates to coating compositions comprising:

(i) a water based water repellent composition comprising an emulsion having water as a continuous phase and, as a discontinuous phase, droplets of a nonvolatile organic water repellent component, the emulsion containing an emulsion stabilizing amount of a hydrophobically modified polyacrylic acid polymer wherein the viscosity of the emulsion is less than about 100 Cps and the particle size of the droplets is less than 50 microns; and (ii) at least one water reducible film-forming polymer.

Because of the surprising ability of the water-based water repellent portion (i) to form stable aqueous compositions in admixture with a wide variety of water-reducible film-forming polymers, and to enhance their water repellency, this invention also relates to a process for improving the water-repellency of coatings which comprise a water-reducible film-forming polymer. The process comprises admixing with the water-reducible film-forming polymer an effective amount of the water-based water repellent composition (i) described above.

It is necessary only to admix an effective amount of the water-based water repellent composition to provide the desired degree of water repellency. In general, the organic water repellent component in (i) will be present in the admixture in an amount to provide at least 1% of the total weight solids of that mixture. For many applications, a useful combination of the components (i) and (ii) are such that the organic water repellent composition of emulsion (i) and the film-forming water-reducible polymer (ii) are present at a weight solids ratio of from 1/99 to 99/1. For water repellent coating applications requiring at least a water repellent effectiveness of 60% under ASTM D4446, a preferred weight solids ratio of the organic water repellent composition of emulsion (i) to the film-forming water-reducible polymer would typically be from about 20/80 to about 80/20.

The coating compositions of this invention can be conveniently prepared by admixing the previously prepared water-based water repellent composition (i) and the water-reducible polymer (ii). It is generally convenient to add both of the two materials as their aqueous solution with relatively low sheer mixing to provide the final product. If desired, either or both portions can incorporate pigments, co-solvents, crosslinkers, driers, catalysts, light stabilizers, fungicides, bacteriocides, surface tension modifiers, waxes, or other conventional additives.

In one of the preferred coating formulations, water will account for about 20 to about 95 weight percent of the compositions and for ease of application by brush, roller or spray, the composition may typically comprise about 50 to 90 weight percent and most preferably about 60 to 85 weight percent water in the final product. The combined nonvolatile portions of the water-reducible film-forming polymer and organic water repellent component typically account for about 5 to about 80 weight percent of these preferred coating compositions.

The water repellent compositions of the invention can be applied to any porous substrate, particularly architectural materials. Architectural materials to which the coating compositions can be applied include wood, brick, masonry, concrete, tile and stucco. The term masonry used herein is meant to describe any inorganic substrate, particularly building compositions and includes, but is not limited to, structural materials such as common brick, paving brick, face brick, drain tile, hollow block, terra cotta, conduits, roofing tile, flue lining, cements such as Portland cement, calcined gypsum products, i.e., molding and building plaster and stucco, magnesia cement, insulation products such as electrical and thermal insulators (diatomaceous earth brick.)

The coating compositions of this invention can be applied to the substrate to be treated by those methods used to apply organic solvent based and water based coating compositions. Such methods include brush or roller application, flood coating or dip coating. Because of the advantageous viscosity of these compositions, they can also be sprayed.

DETAILED DESCRIPTION OF THE INVENTION

1. The Water-based Water Repellent Composition.

The composition and preparation of the water-based water repellent compositions useful in this invention are taught in detail in U.S. Pat. No. 5,338,345 and will be summarized herein. Thus, in accordance with the teaching of the '345 Patent, there is provided an emulsion having water as the continuous phase and, as the discontinuous phase, droplets of a nonvolatile organic water repellent composition, the emulsion containing an emulsion stabilizing amount of a hydrophobically modified polyacrylic acid polymer wherein the viscosity of the emulsion is less than about 100 Cps and the particle size of the droplets is less than about 50 microns.

Conventional compositions using hydrophobically modified polyacrylic acid polymers as the emulsion stabilizer are quite thick, often 1000 Cps and usually much more. One method of achieving the desired viscosity and particle size according to the teaching of the '345 Patent is to use a process that produces high kinetic energy, e.g. high sheer, after the initial emulsion is formed.

1(a) The Polyacrylic Acid Stabilizers.

The hydrophobically modified polyacrylic acid polymer emulsion stabilizers are described, for example, in U.S. Pat. Nos. 4,421,902, 3,915,921, 4,509,949, 4,923,940, 4,996,274 and 5,004,598. These polymers have a large water-loving portion (the polyacrylic acid portion) and a smaller oil-loving portion (typically derived from a long carbon chain acrylate ester). The polymers can be dissolved or dispersed in water. Neutralization with base causes the formation of a gel. Useful polymers are sold as Carbopol® 1342 (a copolymer of acrylic acid and a long chain alkyl methacrylate), 1382 (hydrophobically-modified, crosslinked acrylic acid polymer) and high molecular weight hydrophobically modified Carbopols® such as 1621, 1622, 1623 and Pemulen® TR1 and TR2 which are similar to Carbopol® 1382, all available from B. F. Goodrich. A similar composition, Rheolate® 5000 is available from Rheox Inc. Heighstown, N.J. Preferred are Carbopol® 1342 and Pemulen® TR2. These compounds are described in U.S. Pat. No. 4,509,949. The compound is a polymer derived from a monomeric mixture containing a) 95.9 to 98.8 weight percent of an olefinically unsaturated carboxylic monomer selected from the group consisting of acrylic, methacrylic and ethacrylic acids, b) about 1 to about 3.5 weight percent of an acrylic ester of the formula:

wherein R is an alkyl radical containing 10 to 30 carbon atoms and $R^1$ is hydrogen, methyl or ethyl: and c) 0.1 to 0.6 weight percent of a polymerizable crosslinking polyalkenyl polyether of a parent polyhydritic alcohol containing more than one alkenyl ether group per molecule where in the parent alcohol contains at least 3 carbon atoms and at least 3 hydroxyl groups. The 1621 compound is described in U.S. Pat. No. 4,923,940 (Divisional 4,996,274). Other useful polymers of this type are described in U.S. Pat. No. 5,004,598.

1(b) The Nonvolatile Organic Water Repellent Compositions.

As taught in the '345 Patent, the nonvolatile organic water repellent compositions utilized in the preparation of the water-based water repellent compositions are conventional. Compositions which themselves are liquids (e.g. linseed oil) can be used. In addition, compositions which are normally solids can be dissolved in an organic solvent to form the necessary liquid for the formation of an emulsion with water. Obviously, the amount of organic solvent will be very much less than the amount in a conventional VOC based composition.

The nonvolatile organic water repellent composition can include natural and synthetic waxes. Useful waxes can be selected from the group consisting of paraffinic waxes, microcrystalline waxes, mineral waxes, vegetable waxes, animal waxes, hydrocarbon waxes, organometallic waxes such as aluminum stearates, zinc stearates, and polyoxoaluminum monostearate, hydrogenated oil waxes, chlorinated waxes, and mixtures of such waxes. Paraffin wax is most preferred.

Paraffin waxes generally contain about 14 different straight chain and branched hydrocarbons ranging from $C_{18}H_{38}$ to $C_{32}H_{66}$ and solidify between about 27° C. and about 70° C. (between about 80° F. and about 158° F.). The preferred paraffin waxes generally have melting points in the range of about 40° C. to about 70° C., more preferably from 40° C. to 55° C., for long-term durability of water repellent properties.

The nonvolatile organic water repellent composition can also include hydrocarbon resins as inert hydrophobic filler to provide the coating composition with an additional solid base and binder for the wax or other components. Such a hydrocarbon resin imparts the coating composition with improved long-term durability. Among the hydrocarbon resins which can be used in the nonvolatile organic water repellent composition, there can be mentioned aromatic hydrocarbon resins, aliphatic resins and mixtures thereof. Typical aromatic resins include indene, styrene, methylindenes and methyl styrene. Typical aliphatic resins include cis- and trans-piperylene. Polyisobutylene, a highly viscous hydrocarbon, can be used as a filler and provides long term durability and flexibility to the coatings made from the compositions of the invention. Preferred hydrocarbon resins include a hydrogenated C5 hydrocarbon resin with a dropping point temperature of about 140° C. C5 hydrocarbon resins are well known compositions that are commercially available. Preferred C5 resins include Escarez® 5340 available from Exxon Chemical. Other useful C5 resins include Eastotac® and Piccotac® and Piccotac® 95 resins available from Eastman Chemical Company, Arkon P125 from Arakawa, and Nevrez® resins available from Neville. Mixtures of hydrocarbon resins are also useful. Particularly preferred are mixtures of hydrogenated C5 resins and polyisobutylene.

Other compositions can be used in the nonvolatile organic water repellent composition such as silicone resin (for example Corning Fluid 200), a fluoroalkyl resin such as Dupont Zonyl® PHS, an alkyd including long oil and medium oil alkyds and drying oils such as linseed oil and tung oil.

The nonvolatile organic water repellent composition can also include preservatives such as 3-iodo-2-propynyl butyl carbamate (commercially available as Polyphase® P100 available from Troy Chemical Co.), copper naphthanate, zinc naphthanate, chlorothalanil (tetra chloroisophthalonitrile), 2-(thiocyanomethylthio) benzothiazole, and Busan® 1292 (propiconazole). Useful preservatives include those above which provide for preservation of the coated composition against, for example mildew, as well as bacteriostatic preservatives which protect the composition in the container before application. A particularly useful bacteriostatic preservative is a bicyclic oxazolidines solution, commercially available as Nuosept® 95 available from International Specialty Products (formerly Creanova Inc.). This composition also serves the function of neutralizing the hydrophobically modified polyacrylic acid polymer.

Fragrances may also be incorporated in the nonvolatile organic water repellent composition such as pine oil, benzaldehyde and lemon oil.

As noted, the nonvolatile organic water repellent composition may require a small amount of volatile organic solvent so that the emulsion can be formed. Useful volatile organic solvents are mineral spirits, mineral oil, naphtha, petroleum distillates such as Stoddard's solvent, and ester alcohols such as Texanol® available from Eastman Chemical Company. Mixtures of solvents can also be used. The most preferred solvents are naphtha and mineral spirits.

Surface tension modifiers can be included in the water-based water repellent compositions so as to improve coatability. These materials lower the surface tension of the composition so that the composition will "wet" the substrate thereby facilitating the application process. While typical surface tension modifiers are surfactant like materials, they are not used in the compositions of the invention in an amount that seriously adversely affects the water repellency of the coated substrate. Useful surface tension modifiers include those marketed under the trade names Surfynol® 104 and Surfynol® TG available from Air Products and Chemicals Inc., Allentown Pa. The major ingredient in these surface tension modifiers is: 2,4,7,9,-tetramethyl-5-decyne-4,7,diol. Other surface tension modifiers and mixtures of modifiers can also be used.

In accordance with the teaching of the '345 Patent, the viscosity of the water-based water repellent composition is less than about 100 Cps and preferably between about 5 and 100 and still more preferably about 15–20 Cps. Viscosity is measured in a conventional manner. Specifically, viscosity can be measured using a Brookfield Viscometer Model DV-II. In this method, the torque required to rotate a member through the composition is measured and related to viscosity characteristics. The member that is rotated through the composition is preferably a spindle #00 using the UL adapter with a rotation speed of 100 RPM. While the viscosity of the present compositions is not highly dependent on temperature, it is preferred that the measurement is performed at a temperature of about room temperature.

Similarly, the particle size of the droplets in the emulsion can be measured in a conventional manner. Particle size is preferably measured using a light scattering particle size analyzer such as a Leeds and Northrop FRA Analyzer. In accordance with the teaching of the '345 Patent, the particle size is preferably less than about 50 microns and more preferably between about 0.5 and 50 microns. By particle size, we mean the mean volume particle diameter.

The water-based water repellent composition can be made by first forming a relatively high viscosity, conventional emulsion of this general type. For example, the nonvolatile organic water repellent composition is first formed so that it is a liquid composition. The ingredients for this oil phase are dissolved into an organic solvent if necessary such as petroleum distillate solvent. This composition can be heated to facilitate the dissolution of the components, for example up to about 200° F. (about 93° C.) In another vessel, water and the hydrophobically modified polyacrylic acid polymer are stirred together until the emulsifier is dissolved into the water. The water mixture is neutralized with a base, typically an amine and preferably ammonia. By "neutralized" we mean that the pH of the composition is adjusted to be between about 5 and 8. (The pH before this step is typically between about 3 and 4.) The mixture goes from a thin low viscosity to a thicker viscosity after neutralization. The nonvolatile organic water repellent composition is then added to the water mixture and a milky emulsion is formed immediately. This milky emulsion can be vigorously stirred if desired to facilitate the formation of the emulsion. The last ingredient, a surface tension modifier if desired, is then added to lower the surface tension of the product so it will wet the substrate.

In one preferred embodiment of the process of preparing the water-based water repellent composition, the entire emulsion thus formed is brought to a predetermined temperature prior to the next step. It has been found that if this emulsion is brought to a temperature such that the liquid nonvolatile organic water repellent composition is fully dissolved and homogeneous, the final composition will have improved stability. This temperature is determined before the emulsion is made by analysis of the nonvolatile organic water repellent composition. The temperature of the nonvolatile organic water repellent composition is raised to such a point that the nonvolatile organic water repellent composition is visually clear. Thus, all of the ingredients form a homogeneous solution. This temperature would be comparable to the temperature used to dissolve the ingredients of the nonvolatile organic water repellent composition in the first instance. However, this temperature could be somewhat lower since once dissolved, the components tend to stay in solution at lower temperatures.

As noted above, with the exception of the optional temperature adjustment just discussed, this is a conventional process for forming an emulsion using the described emulsifier but it results in a composition that has a very high viscosity and large particle size. Subsequent processing in devices such as high-pressure homogenizers, microfluidizers, ultrasonic wave generators, and colloid mills then reduces the particle size and viscosity and improves performance of the composition. It is generally accepted that emulsification is accomplished due to kinetic energy dissipation through turbulence, cavitation, shear and possibly impact or decompression. A thorough examination of such mechanisms is described in the Encyclopedia of Emulsion Technology, Volume 1, pgs 57–127 "Formation of Emulsions" by P. Walstra (Marcel Dekker, N.Y., 1983).

The following are examples of high kinetic energy devices with useful ranges of operation:

1. Homogenizers/microfluidizers

These are devices capable of pumping liquids under high pressures (1,000–20,000 psig) which are then forced through a narrow orifice or slit (0.01–1 mm). Potential energy is converted to kinetic energy as the liquid is accelerated to high velocities (100–1,000 m/sec). The kinetic energy is dissipated into heat during passage through the valve, and in this short time (0.01–1 mSec) turbulence, cavitation and shear result in particle size reduction and viscosity loss. Energy densities of $10^3$ to $10^{14}$ W/m$^3$ are attainable. Examples of homogenizers include Gaulin or Rannie homogenizers made by APV Homogenizers, 500 Research Dr. Wilmington, Mass. 01887. Representative microfluidizers are described in U.S. Pat. No. 4,533,254 entitled "Apparatus for Forming Emulsions" and are sold by Microfluidics Corporation, 90 Oak St., Newton, Mass. 02164.

2. Ultrasonic Wave Generators

These are devices capable of converting electrical energy to mechanical vibrations in the form of ultrasonic waves (6–40 kHz) may be used to emulsify the water repellent composition. An example is the Model 350 "Sonifier" made by Branson Ultrasonics Corporations, Eagle Rd., Danbury, Conn. 06810.

3. Colloid Mills

Any of a variety of rotor/stator devices utilizing a narrow gap or slit (0.01–1 mm) capable of producing high shear rates ($10^3$–$10^7$ 1/sec) may be used to emulsify the water-based water repellent composition. Variations include the use of smooth or rough rotors or rotors with blades to impart turbulence in addition to shear. An example includes the Krupp Industrie Technik S-10 available from Krupp AG (Germany).

In one preferred embodiment of the '345 Patent, the final emulsion is made by first subjecting the water solution of the hydrophobically modified polyacrylic acid polymer to high kinetic energy processing followed by simple mixing of the nonvolatile organic water repellent composition. This produces a final product with good viscosity (10–100 cp) but a particle size that is as low as 3 microns. This process has the advantage that the viscosity of the final product can be somewhat independent of the particle size.

In another preferred embodiment of the '345 Patent, the product just described is itself further processed using high kinetic energy processing to produce the final product. This produces a product having still lower particle size, typically as low as 0.5 microns. Pre-treating the aqueous phase allows for higher concentrations of the oil phase while maintaining desired viscosity. An additional advantage is that lower viscosity intermediate product can be processed using lower pressure equipment resulting in lower cost and higher output.

The surface tension modifier can be added at various stages of the process. As noted above, it can be added after the initial formation of the initial oil-in-water emulsion. This is the preferred point in the process for adding the surface tension modifier. It can also be added after the initial emulsion has been processed in the high kinetic energy process as just described. Generally, inferior results are obtained if the surface tension modifier is added before the hydrophobically modified polyacrylic acid polymer is added. This is further evidence that the hydrophobically modified polyacrylic acid polymer is acting in a manner different from a conventional surfactant.

Typically, water accounts for about 20 to about 95 weight percent of the water-based water repellent compositions, preferably about 60 to 90 weight percent and most preferably about 75 to 85 weight percent in the final product.

The nonvolatile organic water repellent composition (including whatever volatile solvent might be necessary) typically accounts for about 5 to 80 weight percent of the water-based water repellent composition. The individual components of the nonvolatile organic water repellent composition (including any volatile solvent necessary) can vary widely. The following table gives representative useful and preferred ranges, in terms of weight percent of the total composition.

| Component | Useful Range | Preferred Range |
| --- | --- | --- |
| Wax | .05–10 | 2.0–5.0 |
| Hydrocarbon resin | 0.05–35 | 2.0–10.0 |
| Fragrance | .05–2 | 0.1–0.3 |
| Preservative (% active) | 0.1–2 | 0.25–1.0 |
| Organic solvents | 5–80 | 10–25 |

One preferred hydrocarbon resin taught in the '345 Patent is a mixture of C5 hydrogenated hydrocarbon resin and polyisobutylene. The C5 resin is preferably present in an amount of from about 4 to 6 percent by weight of the total composition and the polyisobutylene is present in an amount of about 1 to 4 percent by weight of the total composition.

The water-based water repellent compositions of the '345 Patent contain an emulsion stabilizing amount of a hydrophobically modified polyacrylic acid polymer. The exact amount depends on the amount of nonvolatile organic water repellent composition and is typically between about 0.01 to about 5 weight percent of the composition, with a preferred range of between about 0.05 and 3 weight percent, the most preferred range being between about 0.05 and 2.0 weight percent. These weight percents do not include the neutralizing compound which is present in an amount sufficient to cause the hydrophobically modified polyacrylic acid polymer to form a gel in water. This amount is typically between about 0.05 and 5 weight percent with a preferred range being between about 0.1 and 4 weight percent of the total composition.

In some embodiments, the water-based water repellent composition includes a surface tension modifier that is added after initial emulsion formation or at the end of the process after the desired viscosity and particle size have been achieved. The surface tension modifier can be present in the composition at about 0.05 to about 1 weight percent and preferably between about 0.1 and 0.3 weight percent.

In a preferred process of the '345 Patent, a concentrated initial emulsion is prepared (relative to the final product); this concentrate is then subjected to high kinetic energy processing; and in a final step, the product is diluted to its final concentration. This results in smaller particle size and increased productivity. It is desirable to process a composition that is about 60 percent water, about 40 percent nonvolatile organic water repellent composition and then dilute the resulting composition to about 80 percent water 20 percent nonvolatile organic water repellent composition. Mean particle sizes of about 0.5 microns can be easily achieved by this process.

2. Water-reducible Film-forming Polymers.

The second required component in the coating compositions of this invention is at least one water-reducible film-forming polymer. As used herein, the term "film-forming polymer" means that the polymer can form a continuous film upon evaporation of all solvent or carrier and/or upon cure of the polymer. As used herein, the term "water reducible" is meant to include all polymers which can be stably dispersed in water and is intended to include water-soluble polymers, dispersions, emulsions, and latices wherein the volatile content is, or can be, predominantly water.

Water-reducible film-forming polymers are well known in the art and can be prepared by any of the methods known in the art. We have evaluated a wide variety of commercially available water-reducible film-forming polymers in combination with the water-based water repellent compositions of the '345 Patent and have found excellent compatibility with these materials.

Water-soluble polymers are generally understood in the art as those materials with sufficient hydrophilic and/or ionic groups (such as acid or amine groups) on the polymer to provide water solubility. For many applications it is preferred to utilize polymers having a number average molecular weight of at least about 2,000.

One common approach to producing water-soluble polymers is by the condensation reaction of reactants having a stoichiometric excess of ionic groups, such as acid or amine groups which can subsequently be neutralized to provide water solubility. Water-soluble polyesters, polyureas, polyurethanes and other polymers can be prepared in this manner.

For example, the condensation polymerization reaction of reactants having a stoichiometric excess of acid or anhydride groups with reactants having hydroxyl, amine and/or epoxy functionality can produce acid functional polymers which can be neutralized with a base, such as an amine to provide water solubility. Similarly, water-soluble polymers can be produced by the reaction of reactants having a stoichiometric excess of amine functionality with co-reactants such as polycarboxylic acids, polyepoxides, polyisocyanates and other materials to produce amine functional polymers which can be neutralized with acids to provide water solubility.

Another method well known in the art to produce water-soluble polymers is by the free radical polymerization of unsaturated groups having acid or amine functionality such as acrylic acid, methacrylic acid, dimethylaminoethyl acrylate, with other unsaturated monomers followed by neutralization of the ionic groups to provide water solubility.

Representative examples include water-reducible acrylic modified polyesters such as taught in U.S. Pat. No. 4,735,995; acid-functional air drying polyurethanes such as taught in U.S. Pat. No. 5,104,737, and polyurethane dispersions such as taught in U.S. Pat. Nos. 5,310,780 and 5,912,299.

Many other methods for producing water-soluble polymers are also known in the art. Representative commercially available water-soluble resins include Kelsol DV-5862, a water-reducible alkyd from Reichhold Chemicals and Rezimac WR 73-7331, a water-reducible epoxy resin from Eastman Chemical (formerly McWhorter Chemical).

Other water-dispersible film-forming polymers include the latex resins. Representative examples include styrene butadiene latices, polyvinyl acetate latices, acrylic latices, and many others. These types of polymers are frequently prepared by emulsion polymerization wherein the reactive monomers and appropriate initiators are emulsified in water in the presence of emulsifying agents to provide a stable dispersion of polymer particles in water. For some applications of this invention, it is especially useful to utilize latex resins which are more hydrophobic. These types of latices are representatively prepared by utilizing monomers that are more hydrophobic, and by using surfactants or emulsifying agents which are less water sensitive or which can be incorporated directly into the latex polymer itself.

Representative examples of some latices useful in the practice of this invention include the latex polymers taught in PCT application PCT/US99/23428 (WO 00/22016), entitled Latex Polymer Compositions; and U.S. Pat. No. 5,739,196. Representative commercially available latex resins useful in the practice of this invention include Rhoplex® Multilobe 200 (acrylic latex), Rhoplex® AC-264 (acrylic latex) both from Rohm and Haas Company, and Neocar® 2300 (vinyl versatate based latex), UCAR® 651 (acrylic copolymer), Ultracryl® 701 (acrylic latex), Neocar® 820 (acrylic latex), and Neocar® 7657 and 7658 (hydrophobic acrylic latices) all available from Union Carbide Corporation.

The following examples have been selected to illustrate some specific embodiments and practices of advantage to a more complete understanding of the invention. Unless otherwise stated in these examples, "parts" means parts-by-weight and percent water repellent effectiveness (% WRE) is determined according to ASTM Test Method D4446, Anti-Swelling Effectiveness of Water Repellent Formulations and Differential Swelling of Untreated Wood When Exposed to Liquid Water. Under this ASTM Test, Ponderosa Pinewood is cut from five different boards in such a manner that there is open grain on both sides. Typically five wood pieces are treated with a water repellent by immersion for three minutes. The boards are cured under standard conditions for four days and are then inserted into a holding device fitted with a micrometer at one end known as a swellometer gage. The test wafers are immersed in water for 30 minutes and a dial reading is made before and after immersion. The difference between the dial reading of the treated and the untreated control wafers is divided by the dial reading of the untreated control wafers and multiplied by 100. The average of these five readings represent the water repellent effectiveness in percent of the product. Most specifications require that a water repellent formulation exhibit a minimum of 60 percent water repellent effectiveness to be considered a "pass".

Production of Aqueous Water Repellent Compositions

The water-based water repellent compositions useful in this invention can be conveniently prepared by the process taught in U.S. Pat. No. 5,338,345.

EXAMPLE 1 (PP021599A)

A hydrocarbon clear base (44 20 34) was prepared by admixing the following components which were then heated to 180° F. and held at that temperature until all of the resin was dissolved.

| Clear Base 44 20 34 | |
|---|---|
| Raw Materials | Parts |
| Mineral Spirits | 12.98 |
| Polyisobutylene (35% solution)[1] | 46.55 |
| Wax[2] | 18.25 |
| Hydrocarbon Resin[3] | 22.23 |

[1]35% solution of Parapol ® 1300 polyisobutylene (available from Exxon) in mineral spirits
[2]Astorwax ® 1750 paraffin wax available from Honeywell
[3]Nevtac ® 100 C5 hydrocarbon resin from Neville Chemical The following materials were combined and then subjected to high kinetic energy dispersion using a microfluidizer to produce a toner base of an aqueous water repellent composition as taught in the '345 patent:

| Toner Base PPO21599A | |
|---|---|
| Raw Materials | Parts |
| Hydrocarbon Clear Base 44 20 34 | 25.524 |
| Iron Oxide Pigment Yellow #42 50% Solution | 0.563 |
| Red Iron Oxide Pigment 65% Solution | 0.063 |
| Carbon Black Pigment Paste | 0.012 |
| Water | 72.214 |
| Pemulen ® TR-2 Emulsifier | 0.167 |
| Nuosept ® 95 | 0.278 |
| Surfynol ® TG | 0.555 |
| Tetrachloroisophthalonitrile | 0.625 |

The above composition is generally comparable to commercially available Thompsons® Waterseal® X-TRA. The water based water repellent composition of Example 1 was then blended at a 1:1 rate weight solids ratio with a number of commercial aqueous latex polymers. The resulting compositions were applied to Ponderosa Pine test samples and tested in accordance with ASTM D4446 and the results are set forth in the table below:

TABLE 1

| Formula | Components | Weight Solids Ratio | Average Dry Coating Weight (grams) | Average % WRE Absorption[6] | Average % WRE Dimensional |
|---|---|---|---|---|---|
| PP021699A | Rhoplex ML-200[1] PP021599A | 1:1 | 2.81 | 89.71 | 87.91 |
| PP021699B | Rohm & Haas AC-264[2] PP021599A | 1:1 | 2.32 | 78.12 | 63.94 |
| PP021699C | Union Carbide Neocar 2300[3] PP021599A | 1:1 | 2.76 | 81.53 | 77.11 |
| PP021699D | Union Carbide Ucar 651[4] PP021599A | 1:1 | 2.47 | 78.29 | 69.12 |
| PP021699E | Union Carbide Ultracryl 701[5] PP021599A | 1:1 | 2.35 | 90.84 | 89.29 |
| Control #1 | Commercially available Thompsons ® Waterseal ® X-TRA | | 1.49 | 80.83 | 79.43 |
| Control #2 | Rhoplex ML-200 (reduced to 10% NVM) | | 1.14 | 27.37 | 1.21 |
| Control #3 | Rhoplex AC-264 (10% NVM by weight) | | 1.18 | 27.01 | 2.65 |
| Control #4 | Neocar 2300 (10% by weight) | | 1.36 | 29.08 | 0.88 |
| Control #4 | Ucar 651 (10% by weight) | | 1.04 | 22.22 | 2.12 |
| Control #5 | Ultracryl Latex 701 (10% by weight) | | 1.11 | 21.49 | 1.79 |

[1]Rhoplex Multilobe 200 all acrylic latex from Rohm & Haas having 53–54% NVM, pH of 8.5–9.2 and viscosity of 300–1,500 Cps.
[2]All acrylic latex emulsion from Rohm & Haas having 60–61% NVM, pH of 9–9.7 and viscosity of 400 to 1,500 Cps.
[3]Highly branched vinyl versatate latex from Union Carbide having 55% NVM, pH of 5.0 and viscosity of 100 Cps.
[4]Acrylic copolymer latex from Union Carbide, having 65% NVM, pH of 9 and viscosity of 400 Cps.
[5]Small particle size all acrylic latex from Union Carbide, having 48–50% NVM, pH of 8–9 and viscosity of <2,000 Cps.

TABLE 1-continued

| Formula | Components | Weight Solids Ratio | Average Dry Coating Weight (grams) | Average % WRE Absorption[6] | Average % WRE Dimensional |
|---------|------------|---------------------|------------------------------------|------------------------------|---------------------------|

[6] determined as: $\left( \dfrac{\text{weight gain of untreated control} - \text{weight gain of treated sample}}{\text{weight gain of untreated control}} \right) \times 100$ As shown in Table 1, the commercial latex products themselves exhibit very poor WRE performance. The admixtures of those same polymers in combination with the aqueous water repellent compositions, however, surprisingly exhibit dramatically improved WRE scores.

The coatings of this invention as described in Table 1 were also applied to pressure treated pine and cedar and exposed and tested as prescribed under ASTM G-90(ΔE) with the following results:

TABLE 2

| Formula # | Pressure Treated Pine | | Cedar | |
|-----------|-----------|-----------|-----------|-----------|
|           | 6 Months  | 12 Months | 6 Months  | 12 Months |
| PP021699A | 7.72      | 6.18      | 3.62      | 13.64     |
| PP021699B | 9.96      | 9.12      | 3.49      | 12.56     |
| PP021699C | 11.02     | 8.12      | 7.50      | 10.87     |
| PP021699D | 10.25     | 8.07      | 2.12      | 17.66     |
| PP021699E | 8.57      | 9.05      | 1.79      | 19.65     |

The addition of the commercial latex formulas and the aqueous water repellent composition into a single coating surprisingly provides excellent water resistance and excellent color retention in the combined coating formulation. The color retention is significantly better for the blends of water-based water repellent composition and the water-reducible film-forming polymer than for comparably pigmented formulas of the water-based water repellent composition by itself.

EXAMPLE 2 (PP060199A)

The following materials were combined and then subjected to high kinetic energy dispersion utilizing a microfluidizer to produce an aqueous water repellent composition as taught in the '345 Patent:

| Toner Base PPO60199A | |
|----------------------|--------|
| Raw Materials | Parts |
| Hydrocarbon Clear Base 44 20 34 | 49.604 |
| Water | 49.594 |
| Pemulen ® TR-2 Emulsifier | 0.178 |
| Nuosept ® 95 | 0.446 |
| Surfynol ® 104 BC | 0.178 |

The above composition is generally comparable to commercially available Thompsons® Waterseal® X-TRA Clear. The water based water repellent composition of Example 2 was then blended at a 1:1 weight solids ratio with a number of commercial water reducible products. The resulting compositions were applied to Ponderosa Pine test samples and tested in accordance with ASTM D4446 and the results are set forth in the table below:

Each of the commercially available resins was reduced to 15% NVM with water prior to testing or admixture with the aqueous water repellent composition.

TABLE 3

| Formula | Components | Weight Solids Ratio | Average % WRE Absorption | Average % WRE Dimensional |
|---------|------------|---------------------|---------------------------|----------------------------|
| SS06169A | Neorez R-960[1] (reduced to 15% NVM) | | 5.4 | 12.0 |
| SS06169B | Neorez R-960 (15% NVM) PP060199A | 1:1 | 88.1 | 87.0 |
| SS06169C | Neorez R-966[2] (reduced to 15% NVM) | | 19.0 | 5.8 |
| SS06169D | Neorez R-966 (15% NVM) PP060199A | 1:1 | 88.8 | 89.0 |
| SS06169E | Spensol F-97[3] (reduced to 15% NVM) | | 28.6 | 7.6 |
| SS06169F | Spensol F-97 (15% NVM) PP060199A | 1:1 | 89.8 | 87.8 |
| X-TRA | SO7051 PP0848 | | 80.4 | 77.0 |
| SS07149B | Kelsol DV-5862[4] (reduced to 15% NVM) | | 42.8 | 18.7 |
| SS07149C | Kelsol DV-5862 (15% NVM) PP060199A | 1:1 | 87.0 | 91.2 |
| SS07149D | Rezimac WR 73-7331[5] (reduced to 15% NVM) | | 29.9 | 11.5 |
| SS07149E | Rezimac WR 73-7331 (15% NVM) PP060199A | 1:1 | 91.1 | 91.7 |

[1] Aqueous aliphatic polyurethane dispersion from Zeneca Resins.
[2] Aqueous aromatic polyurethane dispersion from Zeneca Resins.
[3] Aqueous oil-modified polyurethane dispersion from Zeneca Resins.
[4] Water reducible alkyd from Reichhold Chemicals.
[5] Water reducible epoxy resin from Eastern Chemical (formerly McWhorter).

Table 3 demonstrates the compatibility and utility of the aqueous water repellent composition in combination with a wide variety of water reducible polymers.

EXAMPLE 3 (PP032299F)

The following materials were combined and subjected to high kinetic energy dispersion utilizing a microfluidizer to produce a toner base:

| Toner Base PPO32299F | |
|---|---|
| Raw Materials | Parts |
| Hydrocarbon Clear Base 44 20 34 | 28.393 |
| Iron Oxide Pigment Yellow #42 50% Solution | 0.575 |
| Red Iron Oxide Pigment 65% Solution | 0.064 |
| Carbon Black Pigment Paste | 0.013 |
| Water | 69.806 |
| Pemulen ® TR-2 Emulsifier | 0.192 |
| Nuosept ® 95 | 0.319 |
| Surfynol ® TG | 0.639 |

The following materials were combined to produce an aqueous water repellent composition:

| Aqueous Water Repellent Composition (PPO40699A) | |
|---|---|
| Raw Materials | Parts |
| Toner base PPO32299F | 78.267 |
| Water | 1.691 |
| Aqueous Ammonia | 0.100 |
| Rhoplex Multilobe 200 | 18.692 |
| Nopocide N40D | 1.250 |

Similar blends were prepared at different ratios of latex to hydrocarbon at comparable PVCs and tested as shown in the following table:

| Formula | Components | Weight Solids Ratio | ASTM G90 (ΔE) Pine 6 months | Average % WRE Absorption | Average % WRE Dimensional |
|---|---|---|---|---|---|
| PP040699A | Rhoplex ML-200 PP032299F | 0.76:1 | 10.09 | 86.34 | 82.23 |
| PP040699B | Rhoplex ML-200 PP032299F | 0.51:1 | 12.31 | 81.55 | 75.31 |
| PP040699C | Rhoplex ML-200 PP032299F | 1.53:1 | 9.79 | 83.01 | 71.69 |
| PP040699D | Rhoplex ML-200 PP032299F | 0.31:1 | 10.34 | 87.83 | 86.88 |
| PP040699E | Rhoplex ML-200 PP032299F | 0.92:1 | 11.24 | 90.79 | 86.97 |

This table demonstrates the effectiveness of blending the water-based water repellent compositions and latices at a variety of weight ratios.

While this invention has been described by a specific number of embodiments, other variations and modifications may be made without departing from the spirit and scope of the invention as set forth in the appended claims.

The entire disclosure of all applications (including provisional applications), patents, and publications cited herein are hereby incorporated by reference.

We claim:

1. A coating composition comprising:
    (i) a water based water repellent composition comprising an emulsion having water as a continuous phase and, as a discontinuous phase, droplets of a nonvolatile organic water repellent component, the emulsion containing an emulsion stabilizing amount of a hydrophobically modified polyacrylic acid polymer wherein the viscosity of the emulsion is less than about 100 Cps and the particle size of the droplets is less than 50 microns; and
    (ii) at least one water reducible film-forming polymer.

2. The composition of claim 1 wherein the emulsion (i) is present at an effective amount for water repellency.

3. The composition of claim 1 wherein the emulsion (i) and the film-forming water reducible polymer (ii) are present at a level to provide a weight solids ratio of the organic water repellent and the film-forming water-reducible polymer of 1/99 to 99/1.

4. The composition of claim 1 wherein the emulsion (i) and the film-forming water-reducible polymer (ii) are present at a level to provide a weight solids ratio of the organic water repellent and the film-forming water-reducible polymer of about 20/80 to about 80/20.

5. The composition of claim 1 wherein the water reducible film-forming polymer (ii) is provided as an aqueous emulsion.

6. The composition of claim 1 wherein the film-forming water-reducible polymer (ii) is provided as an aqueous latex.

7. The composition of claim 6 wherein the latex comprises an acrylic polymer.

8. The composition of claim 1 wherein the film-forming water-reducible polymer (ii) is provided as an aqueous solution of a water-soluble polymer.

9. The composition of claim 8 wherein the water-soluble polymer is a neutralized acid functional polymer.

10. The composition of claim 8 wherein the water-soluble polymer is a neutralized amine functional polymer.

11. The composition of claim 1 wherein the film-forming water-reducible polymer (ii) is provided as an aqueous dispersion.

12. The composition of claim 11 wherein the aqueous dispersion comprises a polyurethane dispersion.

13. The composition of claim 1 wherein the hydrophobically modified acrylic acid polymer is a polymer derived from a monomeric mixture containing:
    a) 95.9 to 98.8 weight percent of an olefinically unsaturated carboxylic monomer selected from the group consisting of acrylic, methacrylic and ethacrylic acids,
    b) about 1 to about 3.5 weight percent of an acrylate ester of the formula:

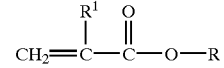

wherein R is an alkyl radical containing 10 to 30 carbon atoms and $R^1$ is hydrogen, methyl or ethyl; and
    c) 0.1 to 0.6 weight percent of a polymerizable crosslinking polyalkenyl polyether of a parent polyhydritic alcohol containing more than one alkenyl ether group per molecule wherein the parent polyhydritic alcohol contains at least 3 carbon atoms and at least 3 hydroxyl groups.

14. The composition of claim 1 wherein the hydrophobically modified polyacrylic acid polymer is present in an amount from about 0.01 to 5 weight percent of the total solids of the nonvolatile organic water repellent composition.

15. The composition of claim 1 wherein the nonvolatile organic water repellent component comprises:
    a) from about 0.5 to 10 weight percent of said component of wax;

b) from about 0.05 to 35 weight percent of said component of hydrocarbon resin;

c) from about 0.05 to 1 weight percent of said component of a surface tension modifier;

d) wherein a), b) and c) are dissolved in from 5 to about 80 weight percent of said component of an organic solvent.

16. The composition of claim 15 wherein the wax is a paraffin wax.

17. The composition of claim 16 wherein the paraffin wax is selected from paraffin waxes having melting points in the range of about 40° C. to about 70° C.

18. The composition of claim 15 wherein the hydrocarbon resin comprises a hydrogenated C5 hydrocarbon resin.

19. The composition of claim 15 wherein the organic solvent is mineral spirits.

20. The composition of claim 15 wherein the surface tension modifier comprises 2,4,7,9-tetramethyl-5-decyne-4,7-diol.

21. The composition of claim 15 wherein the hydrocarbon resin comprises polyisobutylene.

22. The composition of claim 1 wherein the emulsion (i) is prepared by a process comprising the steps of:

a) forming a liquid nonvolatile organic water repellent component;

b) forming a water solution of an emulsion stabilizing amount of a hydrophobically modified polyacrylic acid polymer;

c) neutralizing the water solution formed in b);

d) mixing the composition from a) with the neutralized water solution from b) so as to form an emulsion; and e) subjecting the emulsion formed in d) to high kinetic energy processing until the viscosity of the emulsion is less than about 100 Cps and the particle size of the droplets is less than about 50 microns.

23. The composition of claim 22 wherein, prior to step e), the temperature of said emulsion is brought to a temperature such that the component is fully dissolved and homogeneous.

24. The composition to claim 22 wherein the water solution of hydrophobically modified polyacrylic acid polymer is subjected to high kinetic energy process prior to step d).

25. The composition of claim 22 wherein a surface tension modifying agent is added between step d) and e).

26. The composition of claim 22 wherein the high kinetic energy processing step is microfluidization.

27. A process for improving the water repellency of coatings comprising a water-reducible film-forming polymer which process comprises admixing with the water reducible film-forming polymer an effective amount of a water based water repellent composition comprising an emulsion having water as a continuous phase and, as a discontinuous phase, droplets of a nonvolatile organic water repellent component, the emulsion containing an emulsion stabilizing amount of a hydrophobically modified polyacrylic acid polymer wherein the viscosity of the emulsion is less than about 100 Cps and the particle size of the droplets is less than 50 microns.

28. The process of claim 27 wherein the water based water repellent composition (i) is present in an amount to provide a weight solids ratio of the organic water repellent component to the film-forming polymer (ii) of between 1/99 to 99/1.

29. The process of claim 27 wherein the water-based water repellent composition (i) is present in an amount to provide a weight solids ratio of the organic water repellent component to the film-forming polymer (ii) of between about 20/80 to about 80/20.

30. A process for making a porous material more water repellent, the process comprising the steps of:

a) coating the porous material with the composition of claim 1; and b) allowing the coating to cure or dry.

31. The process of claim 30 wherein the porous material is an architectural material.

32. The process of claim 31 wherein the architectural material is selected from the group of wood, brick, masonry, tile, stucco, concrete and cement.

33. A porous material treated by the process of claim 30.

* * * * *